UNITED STATES PATENT OFFICE.

THOMAS CRISP SANDERSON, OF CHELSEA, NEW YORK.

PROCESS OF PRODUCING METALLIC ANTIMONY.

SPECIFICATION forming part of Letters Patent No. 714,040, dated November 18, 1902.

Application filed July 25, 1901. Serial No. 69,669. (No specimens.)

*To all whom it may concern:*

Be it known that I, THOMAS CRISP SANDERSON, a subject of the King of Great Britain, and a resident of Chelsea, in the county of Richmond, State of New York, have invented certain new and useful Improvements in Processes of Producing Metallic Antimony, of which the following is a specification.

This invention relates to a new method of smelting antimony ores for the production of metallic antimony.

Antimony ores exist generally in the form of sulfids or oxids of antimony, and various methods of treatment have been heretofore suggested or employed for separating out the metallic antimony. According to one method in common use for smelting these ores the ore is put into crucibles, with metallic iron or carbon as the reducing agent, and heated in a suitable furnace. If the ore be sulfid of antimony, the chemical reaction which takes place liberates the antimony and forms sulfid of iron as a residuum, and when such ore contains also a portion of oxid of antimony some oxid of iron is also probably formed, which unites with the earthy matter and forms a slag. There are serious disadvantages in this crucible method. It is slow and expensive, because it admits of only comparatively small charges of ore being treated at one time in a crucible, because of the cost of the crucibles, partly due to breakage and wear and tear, because of the labor involved, and because the method is not continuous—that is, for the treatment of successive charges of ore in a crucible this method requires that it be pursued over and over again from start to finish, with periods of intermission between the separate treatments of the separate charges. Moreover, there is a considerable loss of antimony, due to volatilization during the time required to melt the ore.

Hitherto some attempts have been made to smelt antimony ores on the bed of a reverberatory furnace; but aside from other disadvantages the excessive loss of antimony due to its volatilization during the time required for melting the ores has made failures of these attempts.

In accordance with the present invention I am enabled to carry on the method continuously, and therefore expeditiously, and with less labor and at less expense than heretofore has been possible. The loss of antimony due to volatilization, moreover, is considerably reduced. In carrying out the method I immerse the ore in a molten bath of sulfid of iron, adding a suitable reducing agent for reducing the ore. The purpose of this immersion of the ore is to prevent volatilization and consequent loss of the antimony, which would otherwise occur to the fatal detriment of the method. The ore is preferably immersed by rabbling in the bath, so that the loss of antimony due to volatilization is kept at a minimum. The bath consists of the residuum left after smelting previous charges of ore, so that the bath is being continuously renewed and is always ready when required to receive a fresh charge of ore, thus making the method continuous and effecting a great saving in time and labor. Iron is preferably used as the reducing agent, especially for sulfid ores. Oxid ores may be treated with iron or carbon, or both, as the reducing agent. It is most convenient and economical to use the iron as it comes in the form of scrap or waste, such as tin-plate cuttings or iron turnings or borings.

In the practical employment of my new method I maintain a flame on the surface of the bath and preferably make use of a reverberatory furnace, inasmuch as by its agency the best results are produced in the most efficient manner.

I will now specifically describe the carrying out of the method in its most improved way as applied to sulfid ores and with the employment of a reverberatory furnace. Upon the bed of the furnace a suitable quantity of sulfid of iron is melted, so as to form a bath, sufficient room being left above the level of the molten bath for the reception of the charge of sulfid of antimony ore and for the iron. The damper of the furnace somewhere between the furnace-flue and the chimney is then closed to reduce the draft, which otherwise would induce an unnecessary loss of antimony. The charge of antimony ore is then shoveled into the furnace by one workman, while another quickly rabbles it into the molten bath. The purpose of this rabbling is to immerse the antimony ore as quickly as possible in the molten bath, and so prevent volatilization and consequent loss of antimony. It is best to have the antimony ore dry and if convenient, hot. After the ore has been immersed in the bath the requisite quantity of metallic iron for the reduction of the antimony ore is thrown into the furnace and forms a covering over the bath and the immersed antimony ore. The heat of the furnace is then raised, the damper having been opened and the furnace-doors closed. When the contents of the furnace is sufficiently hot, the charge of iron is then, preferably, well rabbled to thoroughly mix it into the bath. The iron acts upon the antimony ore to reduce it and free the metallic antimony and forms a residuum of sulfid of iron. This reduction takes place very quickly. The metallic antimony is then tapped off through a hole leading from the lowest part of the furnace-bed, where the antimony has been precipitated. As soon as sulfid of iron begins to run from the tap-hole, which is readily discernible, the tap-hole is closed. The slag which has collected on top of the bath is now skimmed off at one of the doors, together with such quantity of iron sulfid as will diminish the bath to its original level. It is then again ready for another charge of antimony ore. The operation is carried on in this way continuously.

Instead of throwing in the iron after the charge of ore has been thrown in, as described, I may throw it into the molten sulfid of iron, where it is dissolved previous to throwing in the charge of ore, or I may, as is preferred, throw in part of the iron before the charge of ore is thrown in and then throw in the rest of the iron as a covering over the ore.

Moreover, before the reduced antimony is tapped off I prefer to throw over the slag which gathers on the top of the molten mass another charge of iron. This last charge of iron is well rabbled and serves to recover a further small amount of antimony from the slag and sulfid of iron. It is intentionally in excess of what is chemically required to reduce the ore in order to insure the most complete recovery of the antimony possible. Hence the antimony precipitated by means of this last charge of iron is for the most part alloyed with iron. This alloy is not tapped off, but remains in the furnace until the next charge is reduced, when the antimony separates from the iron alloy and is tapped off with the antimony reduced from the new charge of ore. Before recharging the furnace with ore the bath is skimmed off to its original level.

Oxid-of-antimony ores mixed with sulfid-of-antimony ores may be treated in substantially the same way. In this case the bath would preferably be sulfid of iron, and the reducing agent would preferably be iron or carbon, or both.

One of the advantages of this method is that it is continuous. In smelting the antimony ores the molten bath is the residuum left after reducing the previous charge or charges of antimony ore and is thus continually renewed. This effects a saving in time, labor, and expense.

I prefer to use metallic iron as the reducing agent for sulfid ores in practicing my method; but other reducing agents may be employed and the benefits of the invention secured. For example, oxid of iron and carbon might be used as the reducing agent.

What I claim as new, and desire to secure by Letters Patent, is—

1. The process of producing metallic antimony which consists in providing a molten bath of sulfid of iron; immersing in the bath antimony sulfid ore; adding a suitable reducing agent for reducing the antimony ore; and running off the metallic antimony from the bath, whereby the process may be carried on continuously for the reduction of repeated charges of antimony ore.

2. The process of producing metallic antimony which consists in providing a molten bath of sulfid of iron; immersing in the bath antimony sulfid ore; adding metallic iron to reduce the antimony ore; and running off the metallic antimony, whereby the process may be carried on continuously for the reduction of repeated charges of antimony ore.

3. The process of producing metallic antimony which consists in providing a molten bath of sulfid of iron; maintaining a flame on the surface of the bath; immersing in the bath antimony sulfid ore; adding a suitable reducing agent for reducing the antimony ore; and running off the metallic antimony from the bath, whereby the process may be carried on continuously for the reduction of repeated charges of antimony ore.

4. The process of producing metallic antimony which consists in providing a molten bath of sulfid of iron; maintaining a flame on the surface of the bath; immersing in the bath antimony sulfid ore; adding metallic iron to reduce the antimony ore; and running off the metallic antimony, whereby the process may be carried on continuously for the reduction of repeated charges of antimony ore.

In testimony whereof I have signed my name to this specification in the presence of two subscribing witnesses.

THOMAS CRISP SANDERSON.

Witnesses:
NICHOLAS M. GOODLETT, Jr.,
ADDISON S. PRATT.